(12) United States Patent
Hsieh et al.

(10) Patent No.: US 7,404,465 B2
(45) Date of Patent: Jul. 29, 2008

(54) CRUISE CONTROL SYSTEM FOR ELECTRIC WHEELCHAIR

(75) Inventors: Shih-Chia Hsieh, Kaohsiung (TW); I-Nan Lin, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 314 days.

(21) Appl. No.: 11/354,867

(22) Filed: Feb. 16, 2006

(65) Prior Publication Data

US 2006/0180368 A1    Aug. 17, 2006

(30) Foreign Application Priority Data

Feb. 16, 2005    (TW) .............................. 94104479 A

(51) Int. Cl.
*B62D 11/03*    (2006.01)

(52) U.S. Cl. .................. 180/170; 180/167; 180/73; 180/74; 180/123; 180/137; 180/192; 180/246; 180/361; 180/388; 180/477; 180/488; 180/1.1; 180/513

(58) Field of Classification Search ............... 180/170, 180/167, 73, 74, 123, 137, 192, 246, 361, 180/388, 477, 488, 513, 1.1
See application file for complete search history.

(56) References Cited

U.S. PATENT DOCUMENTS

| 5,651,422 | A  | * | 7/1997  | Casali ......................... 180/13 |
| 6,702,051 | B2 | * | 3/2004  | Chu et al. .................... 180/13 |
| 6,766,871 | B2 | * | 7/2004  | Sawyer ....................... 180/13 |
| 6,846,042 | B2 | * | 1/2005  | Hanson et al. ......... 297/411.36 |
| 6,860,347 | B2 | * | 3/2005  | Sinclair et al. ............... 180/11 |
| 7,117,967 | B2 | * | 10/2006 | Kidd et al. ................. 180/209 |

\* cited by examiner

*Primary Examiner*—Christopher P. Ellis
*Assistant Examiner*—Cynthia F. Collado
(74) *Attorney, Agent, or Firm*—Pillsbury Winthrop Shaw Pittman, LLP

(57) ABSTRACT

A cruise control system for an electric wheelchair includes: a drive unit for driving the electric wheelchair; a user control unit for transmitting user control signals; a controller selectively operable in a normal control mode for controlling the drive unit such that a speed of the electric wheelchair is adjusted in accordance with the user control signals; and a current detecting unit for detecting a load current of the electric wheelchair and outputting a corresponding current signal. The controller has parameter relation information loaded therein, and is further selectively operable in a cruise control mode for controlling the drive unit with reference to the current signal and the parameter relation information to maintain the speed of the electric wheelchair within a desired speed range.

2 Claims, 2 Drawing Sheets

CRUISE CONTROL SYSTEM FOR ELECTRIC WHEELCHAIR

CROSS-REFERENCE TO RELATED APPLICATION

This application claims priority of Taiwanese Application No. 094104479, filed on Feb. 16, 2005.

BACKGROUND OF THE INVENTION

1. Field of the Invention

The present invention relates to a cruise control system, more particularly to a cruise control system for an electric wheelchair.

2. Description of the Related Art

Electric wheelchairs typically include a control mechanism that is provided on one of the armrests of the electric wheelchair to allow the user to control the speed and direction of the electric wheelchair. Problems may be encountered, however, when traveling uphill or downhill on the conventional electric wheelchair. In particular, due to gravitational forces acting on the combined weight of the electric wheelchair and the user, the electric wheelchair may experience changes in acceleration, and control by user manipulation of the control mechanism such that a constant speed is maintained by the wheelchair is difficult.

When traveling uphill, if the user reacts too slowly, the wheelchair may come to a complete stop and may even start to reverse direction and go downhill. When traveling downhill, on the other hand, the user must exercise great caution as the acceleration may become extreme. In an effort to quickly slow the wheelchair when going downhill, some users may completely release the control mechanism, which results in braking the wheelchair. This may lead to a situation in which the electric wheelchair is abruptly stopped, causing the user to lunge forward and even fall from the wheelchair.

SUMMARY OF THE INVENTION

Therefore, the object of the present invention is to provide a cruise control system for an electric wheelchair so as to overcome at least one of the aforementioned drawbacks of the prior art.

The cruise control system for an electric wheelchair of this invention comprises: a drive unit adapted to drive the electric wheelchair; a user control unit for transmitting user control signals in response to user manipulation of the user control unit; a controller connected electrically to the drive unit and the user control unit and selectively operable in a normal control mode in response to the user control signals for controlling the drive unit such that a speed of the electric wheelchair is adjusted in accordance with the user control signals; and a current detecting unit adapted for detecting a load current of the electric wheelchair and for outputting a corresponding current signal.

The controller has parameter relation information loaded therein to define relationships among the load current of the electric wheelchair, road conditions of the electric wheelchair, load borne by the electric wheelchair, and control parameters for the drive unit.

The controller is further selectively operable in a cruise control mode in response to the user control signals for controlling the drive unit with reference to the current signal and the parameter relation information such that the speed of the electric wheelchair is maintained within a desired speed range.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
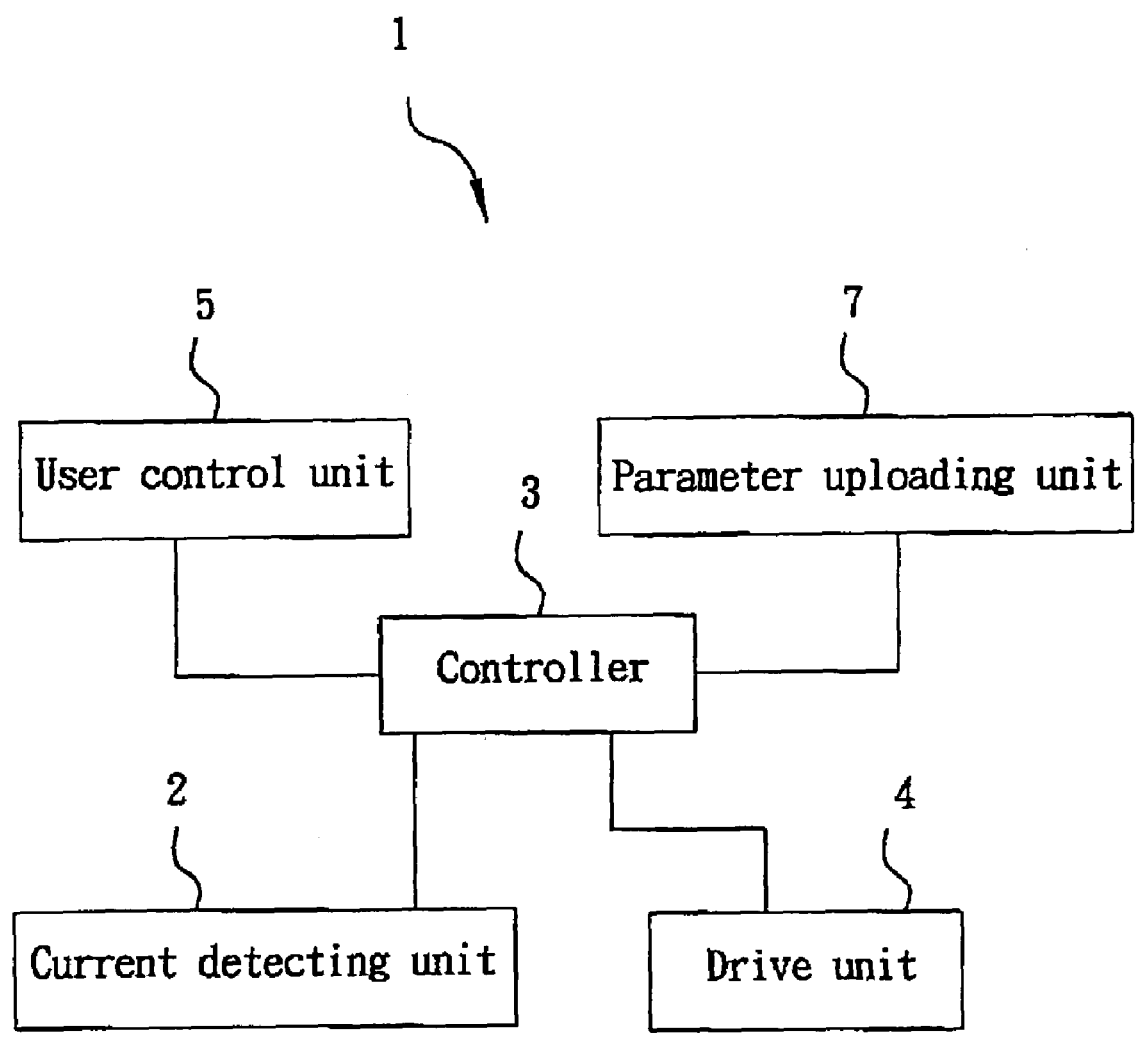
FIG. 1 is a schematic circuit block diagram of a cruise control system for an electric wheelchair according to a preferred embodiment of the present invention.
Figure 2:
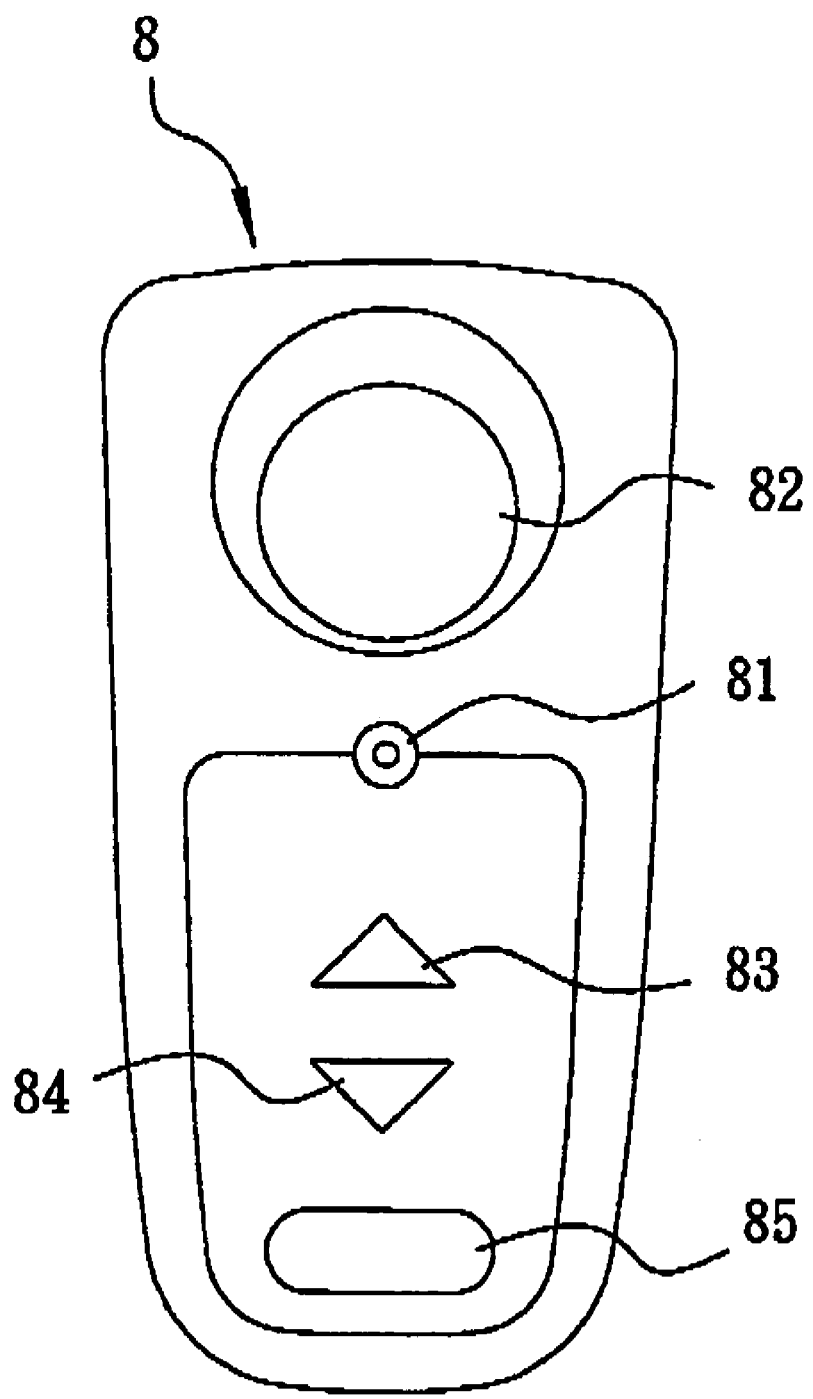
FIG. 2 is a schematic view of a control panel of a user control unit of the preferred embodiment.

Referring to FIG. 1, a cruise control system 1 for an electric wheelchair (not shown) according to a preferred embodiment of the present invention includes a drive unit 4, a user control unit 5, a current detecting unit 2, a controller 3, and a parameter uploading unit 7.

The drive unit 4, which is conventional in construction, is adapted to drive the electric wheelchair in a known manner.

The user control unit 5 transmits user control signals in response to user manipulation of the user control unit 5.

The current detecting unit 2 is adapted to detect a load current of the electric wheelchair, and outputs a corresponding current signal.

The controller 3 is connected electrically to the drive unit 4, the user control unit 5, and the current detecting unit 2. The controller 3 has parameter relation information loaded therein to define relationships among the load current of the electric wheelchair, road conditions of the electric wheelchair, load borne by the electric wheelchair, and control parameters for the drive unit 4.

The controller 3 is selectively operable in a normal control mode in response to the user control signals for controlling the drive unit 4 such that a speed of the electric wheelchair is adjusted in accordance with the user control signals. The controller 3 is further selectively operable in a cruise control mode in response to the user control signals for controlling the drive unit 4 with reference to the current signal and the parameter relation information such that the speed of the electric wheelchair is maintained within a desired speed range.

The parameter uploading unit 7 is used to load customized parameter relation information into the controller 3.

In one embodiment, the user control unit 5 includes a control panel 8, as shown in FIG. 8. The control panel 8 is operated by a user to control the direction and speed of the electric wheelchair, as well as to activate the cruise control mode of the controller 3. The control panel 8 includes a cruise control button 81, a joystick 82, a cruise speed increase button 83, a cruise speed decrease button 84, and a power switch 85.

An example of the operation of the cruise control system 1 will now be described.

The wheelchair is first turned on through user activation of the power switch 85 of the control panel 8 of the user control unit 5. Next, it is determined by the controller 3 if the cruise control button 81 of the user control unit 5 has been activated. If so, the controller 3 operates in the cruise control mode, while if not, the controller 3 operates in the normal control mode. When the controller 3 operates in the normal control mode, the wheelchair is operated in response to the user control signals output by the user control unit 5. For example, in the normal control mode, the wheelchair is operated according to control by the user of the joystick 82 of the control panel 8. When in the normal control mode, the controller 3 continuously checks whether the cruise control button 81 has been activated. Alternatively, the user control unit 5 may transmit a corresponding interrupt signal to the controller 3 upon user manipulation of the cruise control button 81.

If the cruise control button 81 has been activated any time subsequent to activation of the power switch 85, the controller 3 operates in the cruise control mode. In the cruise control mode, the controller 3 performs control with reference to the current signal output by the current detecting unit 2 and the parameter relation information loaded in the controller 3 such that the speed of the electric wheelchair is maintained within a desired speed range. That is, the controller 3 operates the drive unit 4 such that the wheelchair is accelerated forwardly until reaching a default cruise speed, at which point the speed of the wheelchair is maintained within the desired speed range, which is associated with the default cruise speed. Such operation is performed by the controller 3 with reference to the current signal and the parameter relation information as described above.

It is to be noted that the default cruise speed may be altered by user manipulation of the cruise speed increase button 83 or the cruise speed decrease button 84 of the control panel 8 of the user control unit 5. As an example, if it is assumed that the controller 3 provides for a total of 5 cruise speeds as part of its control parameters for the drive unit 4, where cruise speed 5 is the highest speed, cruise speed 1 is the lowest speed, and cruise speed 3 is the initial default cruise speed (when the wheelchair is first turned on), the user may vary the default cruise speed by operating the cruise speed increase and decrease buttons 83, 84. No action is taken by the controller 3, however, if the default cruise speed is already at the maximum or minimum cruise speed.

Furthermore, any forward displacement of the joystick 82 of the control panel 8 by the user when the controller 3 is operating in the cruise control mode is such that the controller 3 exits the cruise control mode and enters the normal control mode. In this case, return of the joystick 82 back to the neutral position by the user results in the controller 3 re-entering the cruise control mode. A conventional spring mechanism may be employed so that such return to the neutral position occurs by the user simply releasing the joystick 82.

Finally, any rearward displacement of the joystick 82 of the control panel 8 by the user when the controller 3 is operating in the cruise control mode is such that the controller 3 exits the cruise control mode and enters the normal control mode. In this case, however, return of the joystick 82 back to the neutral position by the user does not result in the controller 3 re-entering the cruise control mode. The controller 3 re-enters the cruise control mode in this case only when the user again activates the control button 81 of the control panel 8.

Through the cruise control system 1 for an electric wheelchair of the present invention as described hereinabove, the speed of the wheelchair may be automatically maintained within a desired predetermined range. As a result, user safety and ride comfort are enhanced, particularly when traveling uphill and downhill.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A cruise control system for an electric wheelchair, comprising:
    a drive unit adapted to drive the electric wheelchair;
    a user control unit for transmitting user control signals in response to user manipulation of said user control unit;
    a controller connected electrically to said drive unit and said user control unit and selectively operable in a normal control mode in response to the user control signals for controlling said drive unit such that a speed of the electric wheelchair is adjusted in accordance with the user control signals; and
    a current detecting unit adapted for detecting a load current of the electric wheelchair and for outputting a corresponding current signal;
    said controller having parameter relation information loaded therein to define relationships among the load current of the electric wheelchair, road conditions of the electric wheelchair, load borne by the electric wheelchair, and control parameters for said drive unit;
    said controller being further selectively operable in a cruise control mode in response to the user control signals for controlling said drive unit with reference to the current signal and the parameter relation information such that the speed of the electric wheelchair is maintained within a desired speed range.

2. The cruise control system as claimed in claim 1, further comprising a parameter uploading unit for loading the parameter relation information into said controller.

* * * * *